(No Model.)  2 Sheets—Sheet 2.

O. FLOHR.
COMBINED CAR TRUCK AND COUPLING.

No. 502,411. Patented Aug. 1, 1893.

Witnesses  Inventor
  Otto Flohr.
  By H. A. Simpson,
   Attorney

UNITED STATES PATENT OFFICE.

OTTO FLOHR, OF BUFFALO, NEW YORK, ASSIGNOR OF TWO-THIRDS TO HENRY ALTMAN AND GEORGE E. MANN, OF SAME PLACE.

COMBINED CAR TRUCK AND COUPLING.

SPECIFICATION forming part of Letters Patent No. 502,411, dated August 1, 1893.

Application filed December 3, 1892. Serial No. 453,991. (No model.)

*To all whom it may concern:*

Be it known that I, OTTO FLOHR, of Buffalo, in the county of Erie and State of New York, have invented certain new and useful Improvements in a Combined Car Truck and Coupling; and I do hereby declare the following to be a full, clear, and exact description of the invention, such as will enable others skilled in the art to which it appertains to make and use the same.

My invention relates to an improvement in combined car couplings and trucks.

Reliable information obtained from the headquarters of some of our largest railroad lines shows that often from sixty to seventy per cent. of the cars standing idle for repairs have been taken out of service on account of defects in some portion of the draft gear, either couplings, sills, draft springs or attachments. Not the least of the repairs of this character necessary has been from damage to the end sills of cars, and a prevalent cause of this damage resulted from the couplings which instead of being constructed to clear the end sills when struck and compressed, overlapped and hence abutted against them causing abrasion and fracture to the sills struck and a jar to the car and its contents. To avoid this abrasion and fracture of the wood sills which have generally been used metal plate facings have been placed on the sills but this expedient has not been effectual in overcoming and obviating the objections named.

It is the object of my present invention to overcome these defects and to provide means whereby practically all of the concussion is sustained by the trucks and whereby the coupling is prevented from striking any rigid part of the car frame.

With this end in view my invention consists in a car coupling connected with a car truck and in certain other novel features of construction and combinations of parts which will be hereinafter described and pointed out in the claims.

Figure 1:
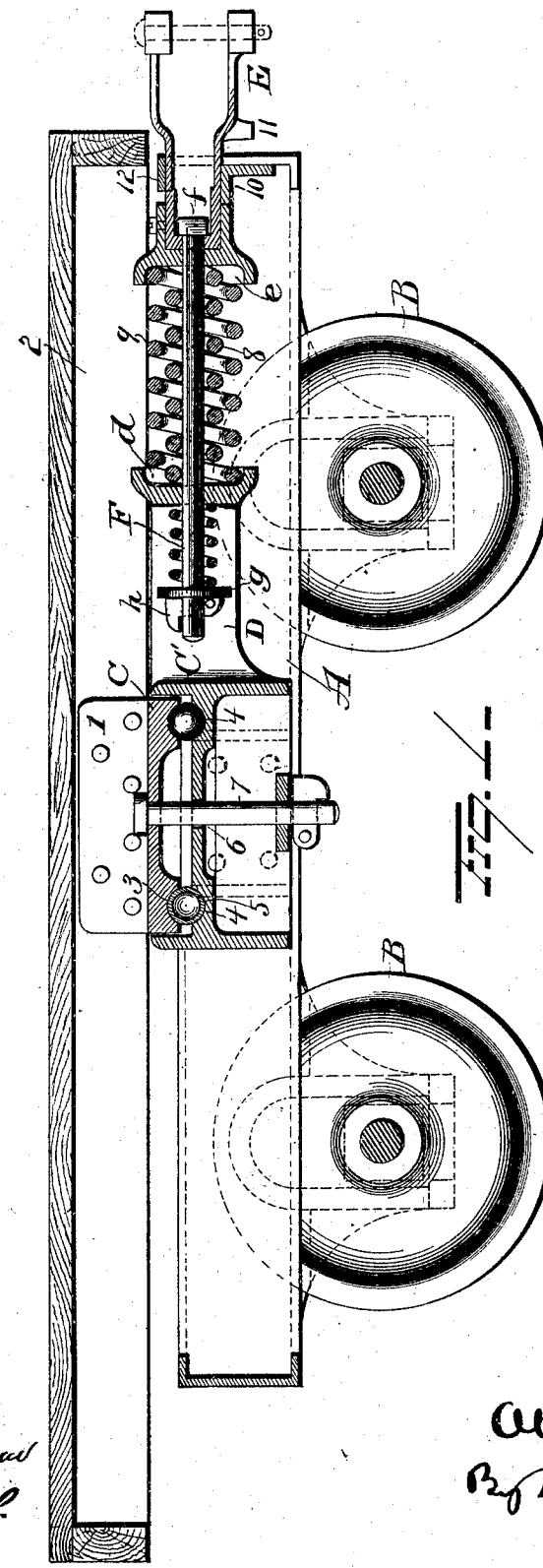
Figure 2:
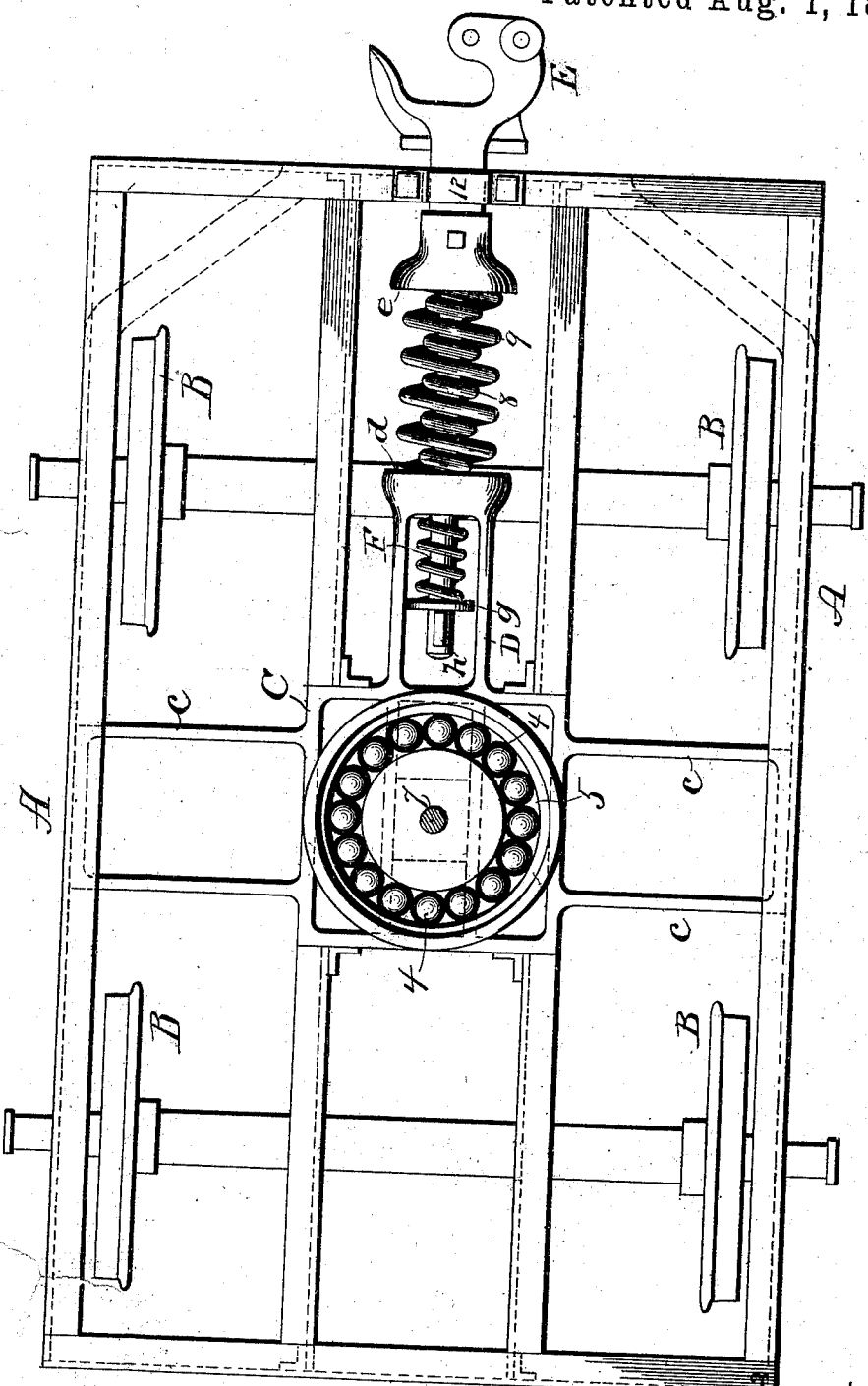

In the accompanying drawings, Figure 1 is a view in side elevation of my improved truck and coupling. Fig. 2 is a plan view in detail.

A represents the truck and B, B, the wheels upon which the truck is supported.

C C' is a fifth wheel comprising the upper and lower sections C and C' respectively. The upper section C is provided with upturned flanges 1 which embrace sides of longitudinal sills 2 of the car frame and are bolted or otherwise secured thereto. The lower face of this section C is rounded and provided with an annular recess 3 for the ball bearings 4, 4. The lower section C' is preferably constructed substantially as shown in Fig. 2, that is to say its center is enlarged and securely bolted or otherwise secured to the central timbers of the truck, and from this center the ends c, c, extend laterally reaching entirely across the truck and are fastened to the side timbers of the truck, so that abundant securing surface is provided and the parts of this section are so far reaching, that the section becomes like an integral part of the truck frame itself so that any pressure or strain thrown upon it is thrown upon the truck proper. The upper face of the central portion of section C' is dished out and rounded to receive the rounded face of the upper section C, the two fitting each other neatly and this lower section C' is furnished with an annular recess 5 corresponding in size and position with recess 3 and in this recess the bearings 4, 4, are held. The two recesses 3 and 5 are concentric with a central hole 6 through which the king bolt 7 which pivotally joins the car frame and truck, passes. In this manner, the two parts are held securely together and a perfect bearing is established. The ball bearings 4, 4, may be solid or hollow but I prefer to have them hollow to make them as light as possible and they are just as effective as solid bearings.

Projecting forwardly from the lower section C' and preferably integral therewith is a yoke D. This yoke is hollow and at its forward end has a concaved or dish-shaped formation d as shown. E is the draw head of the coupling. This also has a dish-shaped or concaved section e at its inner end corresponding in shape with the end d of the yoke, and can be formed integral with the drawhead, loosely mounted thereon, or it may be held thereon by a set-screw (shown in dotted lines) or by other means as desired.

The draw-head has a hollow inner end and a tail bolt F passes loosely through holes in the inner end of the draw-head and the outer end of the yoke and connects the two together. Mounted on the tail bolt and interposed between the convex or dish-shaped sections of the yoke and draw-head is a pair of stiff spiral springs 8 and 9 concentrically arranged. The sections $d$ and $e$ form sockets for the ends of the springs, prevent them from spreading or displacement and the tension of the springs is sufficient to sustain all ordinary concussion due to the buffing of cars in coupling. The tail bolt has a head $f$ on its outer end by which the bolt and coupling are held together and at the inner end within the yoke the tail bolt is preferably provided with a washer $g$ rearward of which a pin $h$ is inserted to hold the washer on, and on the opposite side of this washer, or in other words between the washer and the outer end of the yoke a rubber sleeve or buffer is mounted on the tail bolt to ease the sudden strain and draft upon the car when draft is applied. This rubber buffer might of course be dispensed with or a stiff spring or springs could be substituted therefor if desired.

A plate of angle-iron 10 is secured to the outer end of the truck. This projects inwardly toward the shoulder formed by the section $e$ and is adapted to form an abutment for the latter in the event the draw head is pulled out far enough to strike it. A stop 11 depending from the draw-head is adapted to strike the forward edge of the truck should the compression or impact be sufficient to force the draw head inward far enough. The angle iron being located opposite the point where this projection would naturally strike prevents material damage at this point. A plate 12 secured over the draw-head retains it against vertical displacement.

The outer end of the truck-frame may be made longer than the other end so as to project under the usual end platforms, so as to bring the outer ends of the truck approximately under the outer sills of the car frame. In freight cars the front end of the truck should come approximately under the front sills of the car so that in either instance the couplers will occupy the same position they now occupy and can be coupled up to a car having couplers secured in the ordinary way.

It is evident that slight changes might be resorted to in the form and arrangement of the several parts described without departing from the spirit and scope of my invention and hence I do not wish to limit myself to the exact construction herein set forth, but, Having fully described my invention, what I claim as new, and desire to secure by Letters Patent, is—

1. The combination with a car truck, and a fifth wheel having a forwardly projecting yoke, of a draw head, means for connecting the yoke and draw head and means for holding said draw-head and yoke yieldingly apart, substantially as set forth.

2. The combination with a car frame and truck, of a fifth wheel comprising two sections one secured to the car frame and the other to the truck, the truck section extending approximately from one side of the truck to the other, and having a yoke projecting forwardly therefrom substantially as set forth.

3. The combination with a car frame and truck, of a fifth wheel comprising two sections, one secured to the car frame and the other to the truck, the truck section reaching approximately from one side of the truck frame to the other and a means projecting outwardly from this section, to sustain the inward pressure upon the draw head of a coupling, substantially as set forth.

4. The combination with a car truck, of a casting extending from one side thereof to the other, and a yoke integral therewith, and projecting forwardly therefrom, of a draw head connected with the yoke, and spring interposed between the yoke and draw head, substantially as set forth.

5. The combination with a car truck, of a casting reaching approximately across the truck, and secured thereto, said casting having a forwardly projecting yoke, a draw head having a tail bolt passing loosely through the yoke, a spring interposed between the yoke and draw head, and a spring mounted on the rear end of the tail bolt rearward of the outer end of the yoke, substantially as set forth.

6. The combination with a car truck, and a yoke secured thereon and provided with a concaved or dish shaped outer end, of a draw-head provided with a dish shaped inner end, a tail bolt loosely connecting the yoke and draw-head, and spring mounted on the bolt between the dish shaped ends of the yoke and draw-head, substantially as set forth.

7. The combination with a car truck, and a yoke or similar device secured thereon, of draw-head connected with the yoke, an angle iron secured at the outer end of the truck and projecting inward for the abutment of the draw-head when pulled outward sufficiently and a projection on the draw-head adapted to strike opposite this angle iron plate when forced inward sufficiently, substantially as set forth.

In testimony whereof I have signed this specification in the presence of two subscribing witnesses.

OTTO FLOHR.

Witnesses:
C. S. DRURY,
GEORGE F. DOWNING.